US008096500B2

(12) United States Patent
Burgos Gallego et al.

(10) Patent No.: US 8,096,500 B2
(45) Date of Patent: Jan. 17, 2012

(54) MOBILE SURFACES FOR AIRCRAFT WITH SEALED SLOTS

(75) Inventors: Francisco de Paula Burgos Gallego, Madrid (ES); Manuel Maroto De Hoyos, Madrid (ES)

(73) Assignee: Airbus España S.L., Madrid (ES)

( * ) Notice: Subject to any disclaimer, the term of this patent is extended or adjusted under 35 U.S.C. 154(b) by 647 days.

(21) Appl. No.: 12/372,144

(22) Filed: Feb. 17, 2009

(65) Prior Publication Data

US 2010/0147999 A1 Jun. 17, 2010

(30) Foreign Application Priority Data

Dec. 16, 2008 (ES) .................................. 200803567

(51) Int. Cl.
*B64C 9/00* (2006.01)

(52) U.S. Cl. ............................ 244/89; 244/87; 244/215

(58) Field of Classification Search .................... 244/87, 244/88, 89, 90 R, 90 A, 90 B, 213, 215, 217
See application file for complete search history.

(56) References Cited

U.S. PATENT DOCUMENTS 4,291,853 A * 9/1981 Sigalla ............................ 244/87
4,305,177 A * 12/1981 Feifel ............................ 244/215
4,720,062 A * 1/1988 Warrink et al. ............ 244/90 R
6,145,791 A * 11/2000 Diller et al. .................. 244/215
7,699,266 B2 * 4/2010 Martin Hernandez ........ 244/131

* cited by examiner

*Primary Examiner* — Tien Dinh
*Assistant Examiner* — Michael Kreiner
(74) *Attorney, Agent, or Firm* — Ladas & Parry LLP

(57) ABSTRACT

A lifting or stabilising component (11) for an aircraft comprising in the area of its trailing edge a rotary control element (13) rotating around an axis (61) with at least one slot (21) between the tip (15) of the component (11) and the control element (13), the edges of which are configured such that the distance therebetween, that is, the dimension of the slot (21), is constant for different angles of deflection of the control element (13), being located between them a seal (23) that assure the aerodynamic continuity of the component (11) when the control element (13) is at rest. In a preferred embodiment, the component (11) is a horizontal tail stabilizer and the control element (13) is a rudder.

2 Claims, 2 Drawing Sheets

11
15
15
13
13
21
21
61
63
65
13
15
21

MOBILE SURFACES FOR AIRCRAFT WITH SEALED SLOTS

FIELD OF THE INVENTION

The present invention relates to sealing slots on the edges of a mobile surface of a component of an aircraft and more in particular to sealing the slots existing between a control element, such as a rudder, and the tip of a lift or stabilising component, such as a horizontal tail stabiliser, in which said control element is integrated.

BACKGROUND OF THE INVENTION

The actuation of mobile surfaces of aircraft such as tails, tail stabilisers, "canards", hoists, aerobrakes, ailerons, flaps, other wing flaps (for example "slats") or rudders is one of the most important aspects to take into account in the overall design of aircraft since they are used as control surfaces for controlling the aircraft. For example ailerons are used to control warping, a tail stabiliser is used to control pitch and a rudder is used to control the yaw.

In that type of mobile surface there are slots between different parts. For example, in the case of a horizontal tail stabiliser there are slots at the edges of the rudder which are necessary to allow the movements made by the rudder in aircraft takeoff and landing manoeuvres. However, in cruising conditions, the rudder must normally be at rest whereby sealing said slots to avoid any increase in the aerodynamic drag created by the air flow through the slot is desirable. Any entry of air into said slot could cause undesirable turbulences which would end up forming parasitic drag which would add more load to the affected area.

In the case of the slot existing between the edge of the rudder furthest from the fuselage and the tip of the horizontal stabiliser gum profiles attached to the rudder projecting therefrom to cover the slot are used as sealing elements. However, in the known configurations, the size of said slot varies depending on the angle of deflection of the rudder, which subjects the gum profiles to a wear, forcing early replacement with the drawbacks that this entails. It must be taken into account in this respect that said gum profiles are affected by the climatological conditions typical of a normal flight which can accelerate the deterioration caused by the actual movement between elements.

The present invention seeks to solve this drawback.

SUMMARY OF THE INVENTION

An object of the present invention is to provide a lifting or stabilising component for an aircraft with a control element in which the slot existing between the tip of said component and the control element can be sealed with gum profiles which are not subjected to excessive stresses during the deflections of the control element.

Another object of the present invention is to provide a lifting or stabilising component for an aircraft with a control element in which the slot existing between the tip of said component and the control element has a configuration facilitating its sealing and which is easy to carry out.

These and other objects are achieved with a lifting or stabilising component for an aircraft incorporating in the area of its trailing edge a rotary control element rotating around an axis with at least one slot between the tip of the component and the control element the edges of which are configured such that the distance therebetween, i.e., the dimension of the slot, is constant for different angles of deflection of the control element, sealing means assuring the aerodynamic continuity of the component when said control element is at rest being arranged therebetween.

In a preferred embodiment, said edges have a shape resulting from a hypothetical intersection between with two surfaces of revolution generated by rotating curves around the axis with a first section perpendicular to the axis of rotation, with small dimensions, a second section parallel to the flight direction and a softened transition area between both. A slot with a constant distance whatever the angle of deflection of the control element which is easy to carry out using numerical control machines for the shaping of said edges is thereby achieved.

In another preferred embodiment, the component is a horizontal tail stabiliser and the control element is a rudder. A tail stabiliser with a sealing system between its tip and the rudder preventing the premature deterioration of the sealing means is thereby achieved.

Other features and advantages of the present invention will be made evident from the following detailed description of illustrative embodiments of its object together with the attached drawings.

DETAILED DESCRIPTION OF THE INVENTION

A detailed embodiment of the present invention will be described for the case in which the component of the aircraft is a tail stabiliser and the control element is the rudder incorporated in the stabiliser.

Figure 1:
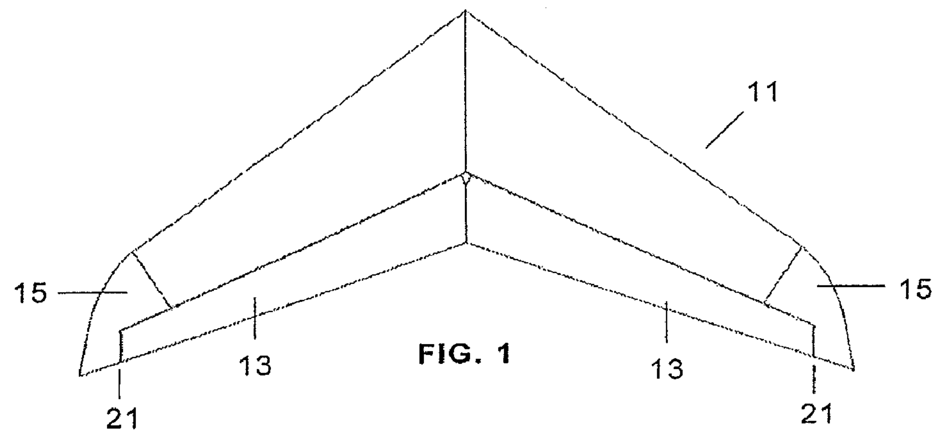
FIG. 1 is a schematic plan view of a horizontal tail stabiliser of an aircraft.

FIG. 1 shows the two parts of a horizontal tail stabiliser 11 of an aircraft with the rudders 13 and the slots 21 existing between the tips 15 of the horizontal tail stabiliser 11 and the edges of the rudders 13.

Figure 2A:
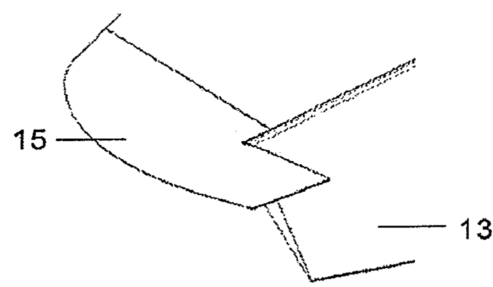
FIGS. 2*a* and 2*b* are schematic perspective views of the tip of a horizontal tail stabiliser with the rudder deflected in two different positions.
Figure 2B:
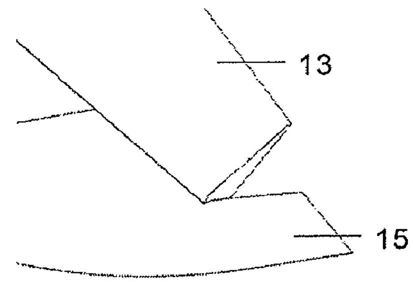

As illustrated in FIGS. 2*a* and 2*b*, the rudders 13 can be deflected downwards or upwards to contribute to controlling the aircraft during takeoff and landing manoeuvres.

Figure 3:
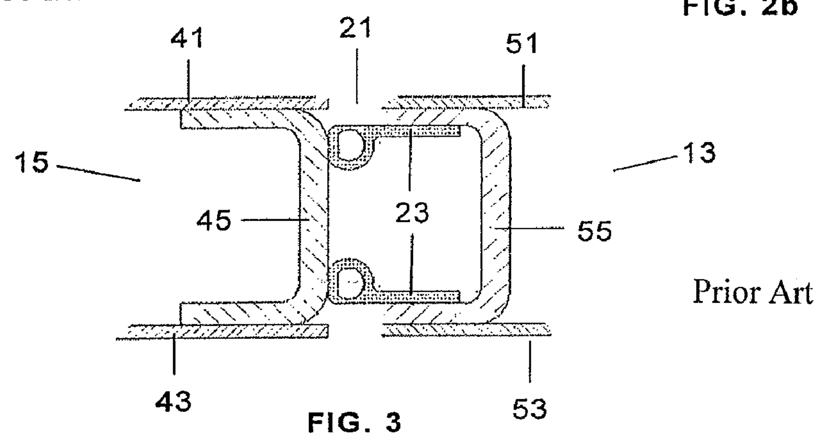
FIG. 3 is a schematic cross-section view of the edge area between the tip of a horizontal tail stabiliser and a rudder and the sealing means for sealing the slot existing therebetween to avoid air flow therebetween when the rudder is at rest.

FIG. 3 illustrates the system known in the art for sealing the slot 21 between the edges of the rudder 13 and the tip 15 of a horizontal tail stabiliser 11 which is based on gum profiles 23. At the edges both of the rudder 13 and of the tip 15 of the horizontal tail stabiliser 11, their upper and lower panels 41, 43; 51, 53 and C-shaped rigidising ribs 45, 55 are respectively seen. The profiles 23 are joined to the rib 55 of the rudder 13 and their heads cover the slot 21.

Figure 4:
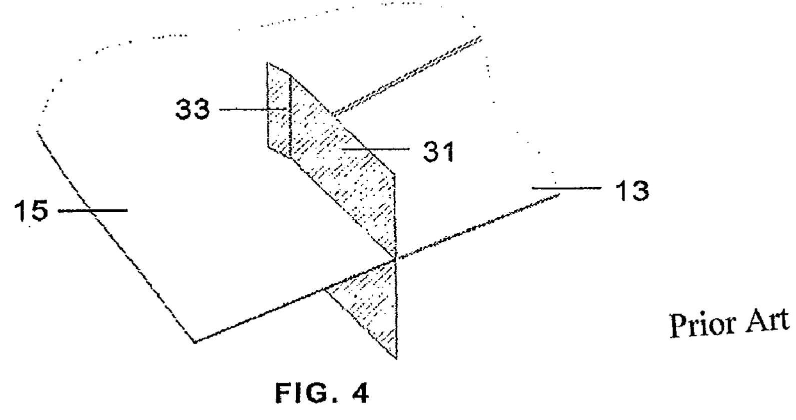
FIG. 4 is a schematic perspective view illustrating the shape known in the art for the edges of the tip of a horizontal tail stabiliser and of a rudder around the slot existing therebetween.

As seen in FIG. 4, the geometric configuration of the edges of the rudder 13 and of the tip 15 of the horizontal tail stabiliser 11 in the slot 21 in the system known in the art it corresponds with that of a planar surface 31 with a final bend 33.

The gum profiles 23 are sized to seal a slot 21 of a predetermined size with the rudder 13 at rest taking into account the deformation tolerances thereof.

However, with the configuration of the edges of the rudder 13 and the tip 15 of the horizontal tail stabiliser 11 known in the art the size of the slot 21 varies according to the angle of deflection of the rudder 13, as indicated in the following table for a 24 mm slot with the rudder 13 at rest.

| ANGLE OF DEFLECTION RUDDER | SLOT SIZE |
|---|---|
| −35° | >24 |
| −30° | >24 |
| −20° | >24 |
| −10° | >24 |
| 0° | 24 |
| 10° | 22.5 |
| 20° | 20.9 |
| 25° | 20.1 |

Therefore, with positive angles of deflection of the rudder 13 the size of the slot 21 is shortened and this involves the application of stresses on the gum profiles 23 which can produce excessive deformations which, together with the continuous friction and exposure to adverse environmental conditions, can cause their premature deterioration.

The basic idea of the present invention is to keep the size of the slot 21 constant for any angle of deflection of the rudder 13 thereby preventing said excessive stresses on the gum profiles 23 which assures that their duration is that which is planned such that they are changed only in the inspections envisaged therefor.

Figure 5:
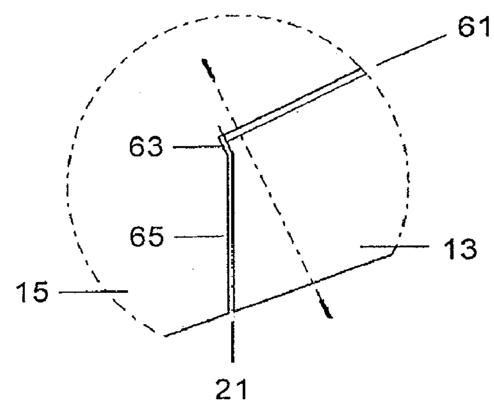
FIG. 5 is a schematic plan view of the edges of the tip of a horizontal tail stabiliser and a rudder around the slot existing therebetween shaped according to the present invention.
Figure 6:
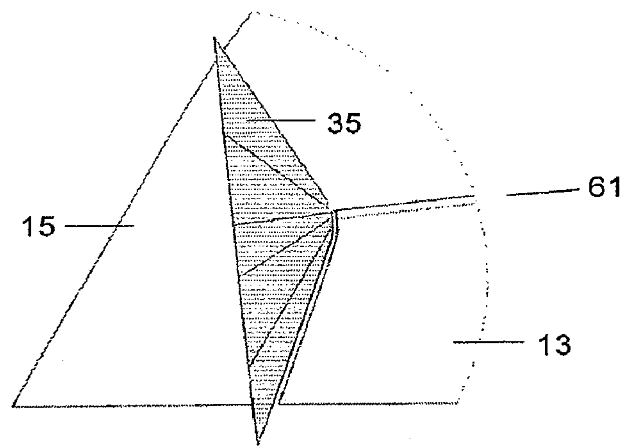
FIGS. 6 and 7 are schematic perspective views illustrating the hypothetical conical surface of revolution the intersection of which with the tip of a horizontal tail stabiliser and a rudder around the slot existing therebetween determines the shape of its edges according to the present invention.
Figure 7:
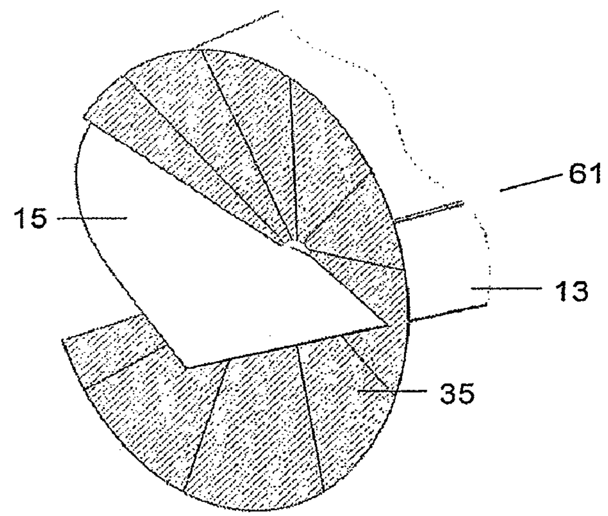

This is achieved in a preferred embodiment of the present invention by modifying the geometry of the edges of the rudder 13 and the tip 15 of the horizontal tail stabiliser 11 in the slot 21 such that instead of being configured by planar surfaces they are configured by conical surfaces of revolution. According to FIGS. 5, 6, 7, said conical surfaces of revolution 35 result from rotating a curve around the axis of rotation 61 of the rudder 13 formed by a first section 63 perpendicular to the axis of rotation 61 of the rudder 13 and having a small length and a second section 65 parallel to the flight direction. In other words, in the part corresponding to the second section 65 the generatrix of said surface of revolution is contained in a plane which passes through the actual axis of rotation 61 and the trailing edge of the rudder 13, and is in turn comprised in a plane parallel to the X-Z plane of the aircraft. In the part corresponding to the first section 63 the generatrix is a straight section perpendicular to the axis of rotation 61 and there is a softened transition area between both sections.

In a preferred embodiment, the length of the first section 63 is comprised between 5 and 15% of the length of the second section 65.

With that geometry, the size of the slot 21 does not vary according to the angle of deflection of the rudder 13.

The embodiment of the edges of the rudder 13 and the tip 15 of the horizontal tail stabiliser 11 with the mentioned geometry can be carried out simply by means of numerical control machines.

For its part, the control of the size of the slot 21 facilitates the use of different types of sealing profiles since the stresses to which they are subjected are reduced. These sealing profiles can be made of materials such as gums, rubbers and silicones and additionally comprise in their outer surface a layer of a fabric with a low coefficient of friction, such as a Teflon fabric, to facilitate the relative movement between the rudder and the tip of the horizontal tail stabiliser.

Those modifications which are comprised in the scope of the following claims can be introduced in the preferred embodiment which has been described.

The invention claimed is:

1. A lifting or stabilising component for an aircraft comprising:

a tip located at a distal end of said lifting or stabilising component in a spanwise direction;

a rotary control element rotating relative to said lifting or stabilising component about an axis of rotation;

at least one slot formed between said tip and said rotary control element; and sealing means arranged in said at least one slot for assuring aerodynamic continuity between said lifting or stabilising component and said rotary control element when said rotary control element is at rest;

characterised in that the edges of said tip and said rotary control element around said at least one slot are configured such that the distance therebetween is constant for different angles of deflection of the rotary control element;

wherein said edges comprise a first section that extends perpendicular to said axis of rotation in the direction of the trailing edge of said lifting or stabilizing component, a second section extending from the first section in a direction opposite the flight direction, and a softened transition area therebetween, the length of said first section being between 5 and 15% of the length of said second section.

2. The lifting or stabilising component for an aircraft according to claim 1, characterised in that said component is a horizontal tail stabiliser and said control element is a rudder.

* * * * *